(12) United States Patent
Mai

(10) Patent No.: US 8,667,868 B2
(45) Date of Patent: Mar. 11, 2014

(54) WATER HEATER WRENCH ADAPTER AND METHOD OF USE

(76) Inventor: Hoa Mai, Enterprise, AL (US)

( * ) Notice: Subject to any disclaimer, the term of this patent is extended or adjusted under 35 U.S.C. 154(b) by 221 days.

(21) Appl. No.: 13/423,425

(22) Filed: Mar. 19, 2012

(65) Prior Publication Data

US 2013/0239381 A1     Sep. 19, 2013

(51) Int. Cl.
*B25B 13/58* (2006.01)
*B23P 6/00* (2006.01)

(52) U.S. Cl.
CPC .. *B23P 6/00* (2013.01); *B25B 13/58* (2013.01)
USPC ............................. 81/52; 81/180.1; 29/402.08

(58) Field of Classification Search
USPC .............. 81/52, 176.2, 125, 180.1; 29/402.08
See application file for complete search history.

(56) References Cited

U.S. PATENT DOCUMENTS

| | | | |
|---|---|---|---|
| 2,752,811 A | | 7/1956 | Wenchel |
| 5,690,639 A | * | 11/1997 | Lederer et al. ................ 606/104 |
| 6,182,537 B1 | * | 2/2001 | Vasichek et al. ................ 81/125 |
| 6,397,706 B1 | * | 6/2002 | Maznicki ..................... 81/121.1 |
| 7,293,483 B1 | | 11/2007 | Hutchings et al. |
| 7,594,312 B1 | | 9/2009 | Marcus |
| 7,647,683 B1 | | 1/2010 | Marcus |
| 8,020,472 B2 | | 9/2011 | Kelly et al. |
| 2010/0275738 A1 | | 11/2010 | Taylor, Jr. |

* cited by examiner

*Primary Examiner* — David B Thomas
(74) *Attorney, Agent, or Firm* — Matthew L. Grell; Baiser & Grell IP Law

(57) ABSTRACT

A water heater wrench adapter that comprises a rotating adapter and receiver. The rotating adapter is disposed within a receiver in light interference fit, wherein the rotating adapter is frictionally engaged by the receiver to permit rotation of the rotating adapter within the receiver. The water heater wrench adapter is utilized by frictionally engaging the insulator profile with the rotating adapter, thereby securing the water heater element within the rotating adapter. The hex nut of the water heater element and the hex extension of the receiver are aligned and the hex end of a water heater wrench is disposed to engage the combined hex nut and hex extension. Thus, the water heater wrench can then be utilized to either hold the water heater element in position for installation in a water heater or remove and retain the water heater element from the water heater.

20 Claims, 3 Drawing Sheets

WATER HEATER WRENCH ADAPTER AND METHOD OF USE

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to wrenches for removing water heater elements, and more specifically to a water heater wrench adapter for securing the water heater element within the wrench during removal and installation.

2. Description of Related Art

Water heaters typically comprise a tank to contain water and a heating element to heat and maintain the water at a selected temperature. Unfortunately, such heating elements have a short lifetime and must routinely be replaced.

A water heater element generally comprises a sheathed electrical coil (typically called an immersion heater) with the coil extending inside the water heater, threads to secure the element by engaging complimentary threads in a fitting on the water heater, a hex nut for gripping by a wrench and an insulator on the outermost side of the water heater element, the insulator having electrical contacts therethrough, such as, for exemplary purposes only, screws or quick connect tabs.

The wrench utilized to remove and/or install a water heater element typically comprises a hexagonally-shaped end and a handle that has holes for receiving the blade of a screwdriver to provide leverage during turning of the water heater element. The hexagonally-shaped end engages the hex nut of the water heater element.

When the water heater element is removed from the water heater the wrench is rotated by hand and the water heater element is withdrawn. However, because the water heater element is retained only by the hexagonally-shaped end of the wrench, once the water heater element is loosened, it typically tips out of the wrench, particularly once the water heater element has been extracted from the water heater. Accordingly, the water heater element may fall from the wrench and be damaged or destroyed. While this is usually not a problem during removal, since the water heater element is spent, when a new water heater element is being installed, the similar problem occurs and the new water heater element may be damaged or destroyed.

Therefore, it is readily apparent that there is a need for a water heater wrench adapter for securely retaining a water heater element during extraction and insertion.

BRIEF SUMMARY OF THE INVENTION

Briefly described, in a preferred embodiment, the present invention overcomes the above-mentioned disadvantages and meets the recognized need for such a device by providing a water heater wrench adapter that comprises a rotating adapter and receiver. The rotating adapter is disposed within receiver in light interference fit, wherein the rotating adapter is frictionally engaged by the receiver to permit rotation of the rotating adapter within the receiver. The water heater wrench adapter is utilized by frictionally engaging the insulator profile with the rotating adapter, thereby securing the water heater element within the rotating adapter. The hex nut of the water heater element and the hex extension of the receiver are aligned and the hex end of a water heater wrench is disposed to engage the combined hex nut and hex extension. Thus, the water heater wrench can then be utilized to either hold the water heater element in position for installation in a water heater or remove and retain the water heater element from the water heater.

According to its major aspects and broadly stated, the present invention in its preferred form is a water heater wrench adapter comprising a rotating adapter having faces dimensioned to cooperatively engage and grip a portion of a water heater element and a receiver rotationally disposed about the rotating adapter and dimensioned to frictionally engage the rotating adapter in a light interference fit. The portion of the water heater element that is typically cooperatively engaged by the rotating adapter is an insulator that typically is disposed on a water heater element outside a water heater.

The water heater wrench adapter is associated with a water heater wrench that is utilized to turn the water heater wrench adapter and a water heater element gripped thereby. The wrench has a handle with throughholes therein that are dimensioned to receive a leverage rod, such as the blade of a screwdriver.

The receiver comprises a hexagonal extension having substantially the same hexagonal dimension as a hex nut of the water heater element, and the water heater wrench comprises a hex end dimensioned to cooperatively engage the water heater element and the receiver when the hex nut of the water heater element and the hex extension of the receiver are in alignment. The hex end of the wrench is slightly larger but substantially the same size as the hex dimension of the hex nut and the hex extension.

The water heater wrench adapter is utilized to remove or install a water heater element by obtaining the water heater wrench adapter and rotating the receiver to a position wherein the hex extension is aligned with the hex nut of the water heater element, disposing the hex end over the water heater wrench adapter, and turning the wrench. Optionally, a screwdriver blade is inserted into the throughholes to provide turning leverage for the wrench.

More specifically, the present invention is a water heater wrench adapter having a receiver with a rotating adapter therein, the rotating adapter having faces, an outer surface and an aperture. The receiver comprises a hex extension, a body, an inside surface and an aperture, wherein the inside surface is dimensioned to engage the outer surface of the rotating adapter in a light interference fit. Accordingly, once the rotating adapter is inserted into the receiver, it is retained therein in a fixed position, while still being able to rotate relative to the receiver when turning forces are applied. The faces are dimensioned to engage the insulator faces on a water heater element in a light interference fit, wherein the water heater element is thereby removably secured within the rotating adapter. The faces of the rotating adapter can be dimensioned to fit the insulator or another protruding portion of a variety of water heater elements. Thus, since only the rotating adapter needs to be changed to fit different water heating elements, a minimum of components can be provided for removal of a variety of different water heating elements.

In use for removal of a water heater element, after removal of the electrical connecting wires from tabs or screws on the insulator, the water heater wrench adapter is disposed over the water heater element, gripping it via a light interference fit between the faces of the rotating adapter and the insulator faces. The receiver is subsequently rotated to align the hex extension of the receiver with the hex nut of the water heater element. The hex nut and the hex extension are of substantially the same hexagonal dimension.

A wrench is disposed over the water heater wrench adapter and is utilized for turning the water heater wrench adapter. The wrench has a handle with throughholes dimensioned to receive a screwdriver to apply leverage to the wrench, and a hex end dimensioned to engage the hex nut and hex extension combination when the hex nut and the hex extension are in alignment.

The interior dimension of the hex end is of approximately the same hexagonal dimension, but slightly larger, than the hex extension and the hex nut. The hex end cooperatively engages the combination of the aligned hex extension and hex nut, thereby securing the hex extension and hex nut in alignment, and further providing a larger grip surface for the hex end than would otherwise be the case without the water heater wrench adapter.

The wrench is rotated, either by hand, or, optionally, by a screwdriver inserted into the throughholes in the wrench handle. The screwdriver is turned, thereby removing the water heater element from the water heater, while securely retaining the water heater element within the combination of wrench and water heater wrench adapter.

Similarly, in use for installation of a water heater element, the water heater wrench adapter is disposed on the water heater element with the water heater element being securely and removably retained within the water heater wrench adapter. The wrench is disposed on the combination of the water heater element and the water heater wrench adapter, and the water heater element is inserted into a water heater and secured by rotation to engage the water heater element threads with the water heater threads.

Accordingly, a feature and advantage of the present invention is its ability to securely remove a water heater element from a water heater without concern for the water heater element falling.

Another feature and advantage of the present invention is its ability to securely hold a water heater element when aligning same during installation.

Still another feature and advantage of the present invention is its ability to prevent damage to a water heater element during installation and/or removal.

Yet another feature and advantage of the present invention is its ability to be dimensioned to match a variety of water heater elements.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred Embodiment with reference to the accompanying drawing figures, which are not necessarily drawn to scale, and in which like reference numerals denote similar structure and refer to like elements throughout, and in which.

DETAILED DESCRIPTION OF THE PREFERRED EMBODIMENT OF THE INVENTION

In describing the preferred embodiment of the present invention, as illustrated in FIGS. 1A-5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1B and 3-5, the present invention in a preferred embodiment is water heater wrench adapter 120, wherein water heater wrench adapter preferably comprises rotating adapter 110 and receiver 115. Rotating adapter 110 is preferably disposed within receiver 115, wherein rotating adapter 110 is preferably frictionally engaged by receiver 115 in a light interference fit to preferably permit rotation of rotating adapter 110 within receiver 115.

Figure 1A:
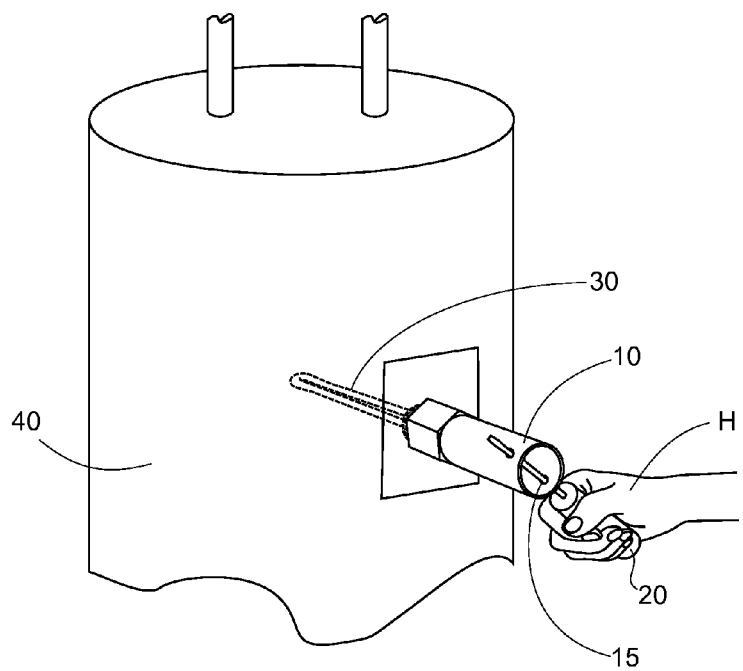
FIG. 1A depicts a perspective view of a water heater element being extracted from a water heater using a water heater wrench, according to the prior art.
Figure 1B:
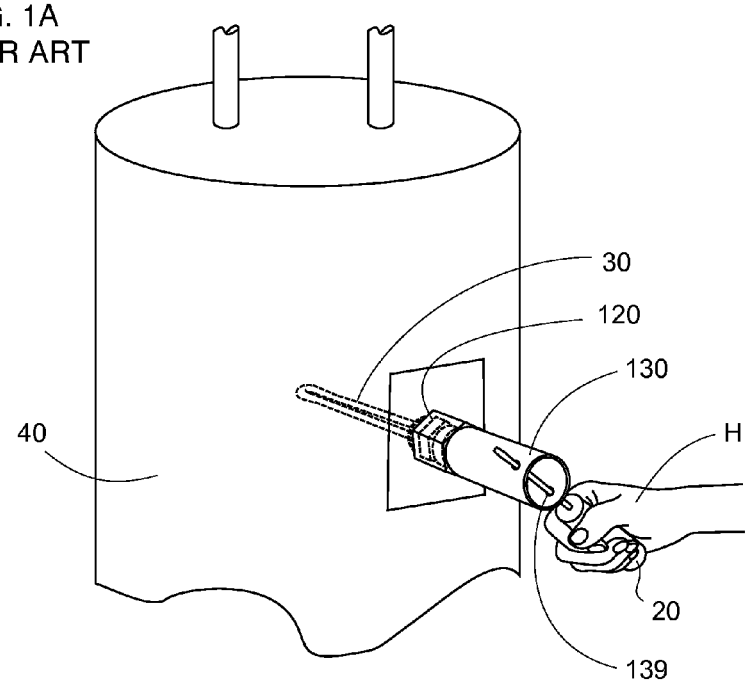
FIG. 1B depicts a perspective view of a water heater element being extracted from a water heater using a water heater wrench and a water heater adapter according to a preferred embodiment.
Figure 2:
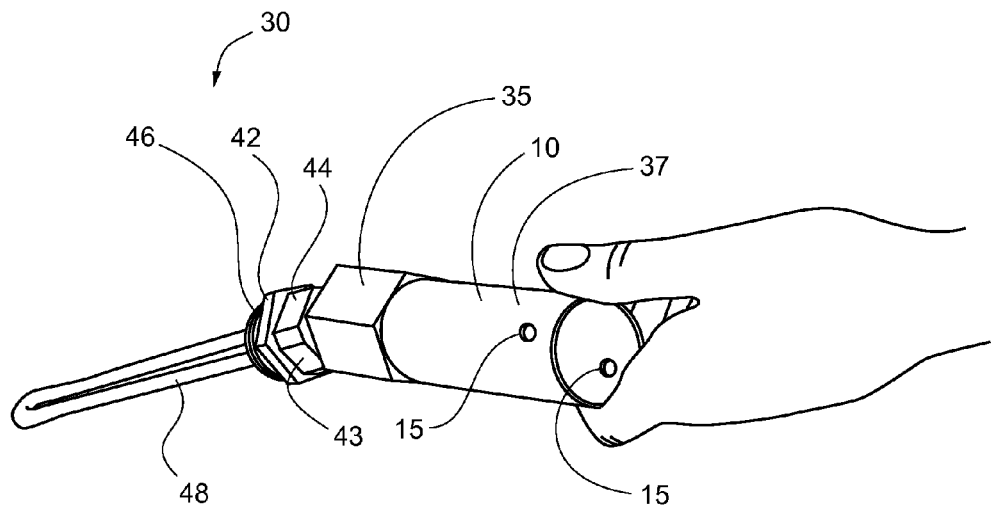
FIG. 2 depicts a perspective view of a water heater element during and after extraction from a water heater using a prior art water heater wrench.
Figure 3:
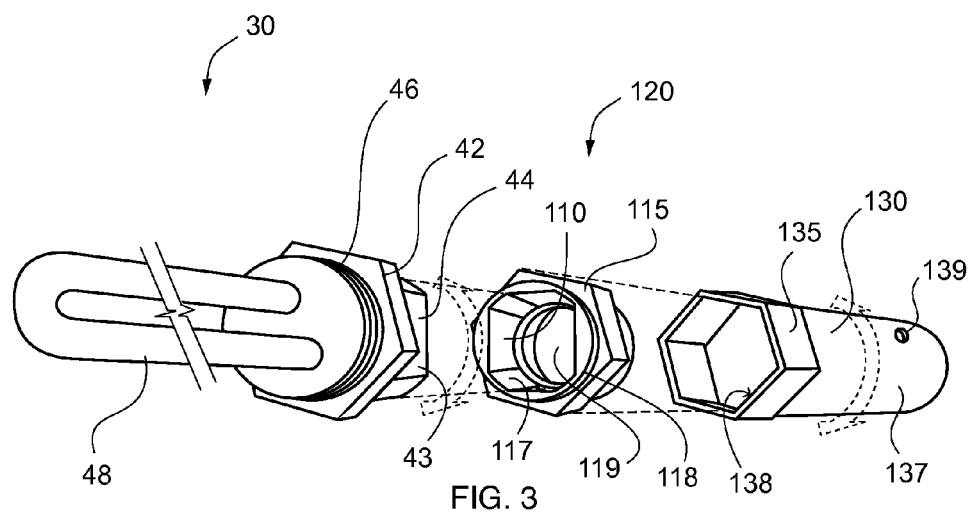
FIG. 3 depicts an exploded perspective view of a water heater element, a water heater wrench adapter according to a preferred embodiment, and a water heater wrench.
Figure 4:
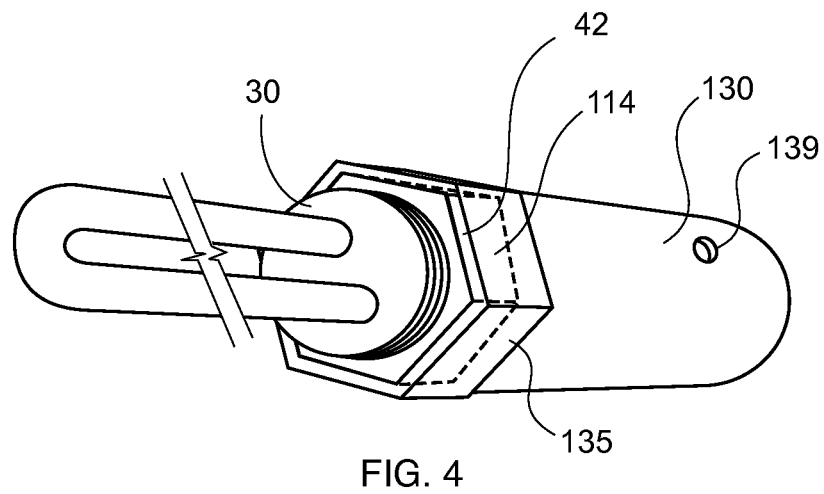
FIG. 4 depicts a perspective view of a water heater element retained by the water heater wrench adapter of FIG. 3, both the water heater element and the water heater wrench adapter of the preferred embodiment being engaged by the water heater wrench.
Figure 5:
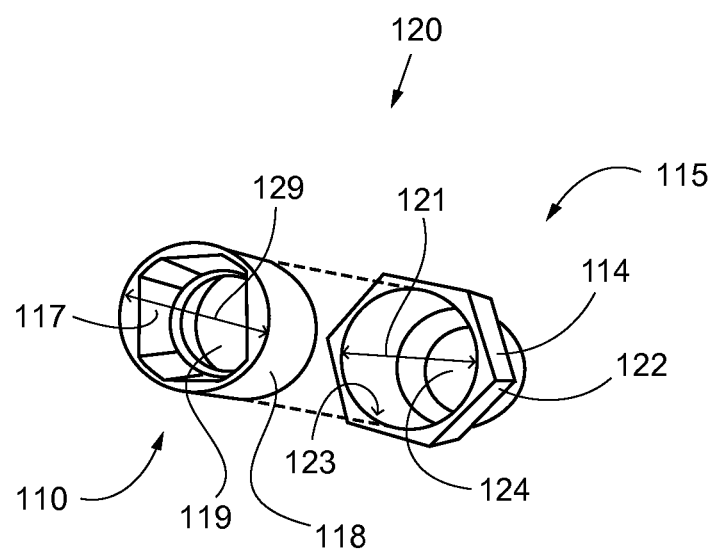
FIG. 5 depicts an exploded perspective view of the water heater wrench adapter of FIG. 3.

Turning now more particularly to FIGS. 1A and 2, in the prior art, water heater element 30 comprises coil 48, threads 46, hex nut 42 and insulator 44, wherein threads 46 cooperatively engage threads (not shown) on water heater 40, thereby securing water heater element 30 to water heater 40. Insulator 44 comprises faces 43.

Wrench 10 comprises first end 35 and handle 37, wherein handle 37 comprises throughholes 15 dimensioned to receive screwdriver 20. Hex nut 42 is typically hexagonal in shape and first end 35 of wrench 10 is also hexagonal in shape and is dimensioned to engage hex nut 42. It will be recognized by those skilled in the art that shapes other than hexagonal could be utilized for hex nut 42 and first end 35 without departing from the spirit of the preferred embodiment.

When water heater element 30 is removed from water heater 40, such removal is typically performed by engaging hex nut 42 (best shown in FIG. 2) by first end 35 of wrench and rotating wrench 10 by hand H. Optionally, screwdriver 20 could be inserted into throughholes 15 (best shown in FIG. 2), thereby providing leverage to turn wrench 10 to unscrew water heater element 30. Unfortunately, with the prior art device and method, during removal, water heater element 30 is not securely retained by wrench 10 and may fall therefrom, possibly damaging water heater element 30.

Similarly, in the prior art, when replacing water heater element 30, hex nut 42 is engaged by first end 35 of wrench 10, but is retained insecurely unless water heater element 30 is held by hand H to prevent water heater element 30 from falling out of wrench 10 (best shown in FIG. 2) while water heater element 30 is being inserted into and screwed into water heater 40.

Turning now more particularly to FIGS. 1B and 3-5, rotating adapter 110 preferably comprises faces 117, outer surface 118 and aperture 119, wherein outer surface 118 comprises diameter 129. Receiver 115 preferably comprises hex extension 114, body 122, inside surface 123 and aperture 124, wherein inside surface 123 is preferably dimensioned to engage outer surface 118 in light interference fit, wherein interior diameter 121 of receiver 115 is preferably approximately the same as, but slightly larger than, diameter 129 of rotating adapter 110 to provide the light interference fit.

Accordingly, once rotating adapter 110 is inserted into receiver 115, it is preferably retained therein in a fixed position, while still being able to rotate relative thereto when turning forces are applied. Faces 117 are preferably dimensioned to engage insulator faces 43 in light interference fit, wherein water heater element 30 is thereby removably secured within rotating adapter 110.

Faces 117 of rotating adapter 110 can be dimensioned to fit insulator 44 or other protruding portion of a variety of water heater elements 30. Since only rotating adapter 110 needs to be changed to fit different water heating elements 30, a minimum of components can be provided for removal of a variety of different water heating elements 30.

In use for removal of water heater element 30, after removal of connecting wires (not shown) from tabs or screws (not shown) on insulator 44, water heater wrench adapter 120 is preferably disposed over water heater element 30 gripping same via light interference fit between faces 117 and insulator faces 43. Receiver 115 is preferably subsequently rotated to align hex extension 114 with hex nut 42.

Wrench 130 is utilized for turning water heater wrench adapter 120, wherein wrench 130 comprises hex end 135 and handle 137, and wherein handle 137 comprises throughholes 139 disposed opposite one another on handle 137 and dimensioned to receive screwdriver 20, and wherein hex end 135 comprises interior dimension 138.

As noted hereinabove, hex nut 42 is preferably typically hexagonal in shape, hex extension 114 is preferably hexagonal in shape and of substantially the same hexagonal dimension as hex nut 42, and hex end 135 of wrench 120 is also preferably hexagonal in shape, and is preferably dimensioned to engage hex nut 42 and hex extension 114 when hex nut 42 and hex extension 114 are in alignment. Interior faces 138 of hex end 135 of wrench 130 are preferably of approximately the same hexagonal dimension as, but slightly larger than, hex extension 114 and hex nut 42. It will be recognized by those skilled in the art that shapes other than hexagonal could be utilized without departing from the spirit of the preferred embodiment.

Hex end 135 of wrench 130 is preferably disposed over water heater wrench adapter 120, wherein hex end 135 preferably cooperatively engages the combination of aligned hex extension 114 and hex nut 42, thereby preferably securing hex extension 114 and hex nut 42 in alignment, and further preferably providing a larger grip surface for hex end 135 than would otherwise be the case without water heater wrench adapter 120. Wrench 130 is preferably rotated, either by hand H (best shown in FIG. 2) or, optionally, screwdriver 20 is inserted into throughholes 139 and screwdriver 20 is turned (best shown in FIG. 1B), thereby removing water heater element 30 from water heater 40, while securely retaining water heater element 30 within combination of wrench 130 and water heater wrench adapter 120. It will be recognized by those skilled in the art that water heater wrench adapter 120 could be inserted into hex end 135 of wrench 130 prior to disposition of water heater wrench adapter 120 on water heater element 30.

Similarly, in use for installation of water heater element 30, water heater wrench adapter 120 is preferably disposed on water heater element 30 with water heater element 30 being preferably securely and removably retained within water heater wrench adapter 120. Wrench 130 is preferably disposed on the combination of water heater element 30 and water heater wrench adapter 120, and water heater element 30 is preferably inserted into water heater 40 and secured by rotation to engage threads 46 with water heater threads (not shown). It will be recognized by those skilled in the art that wrench 130 could be disposed on water heater wrench adapter 120 prior to disposition of water heater wrench adapter 120 on water heater element 30.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A water heater wrench adapter comprising:
a rotating adapter comprising faces dimensioned to cooperatively engage a portion of a water heater element; and
a receiver rotationally disposed about said rotating adapter and dimensioned to frictionally engage said rotating adapter in a light interference fit.

2. The water heater wrench adapter of claim 1, wherein said water heater wrench adapter is associated with a water heater wrench.

3. The water heater wrench adapter of claim 2, wherein said receiver comprises a hexagonal extension having substantially the same hexagonal dimension as a hex nut of the water heater element.

4. The water heater wrench adapter of claim 3, wherein said water heater wrench comprises a front end dimensioned to cooperatively engage the water heater element and said receiver when the hex nut of the water heater element and said hex extension of said receiver are in alignment.

5. The water heater wrench adapter of claim 2, wherein said wrench comprises a handle with throughholes therein, and wherein said throughholes are dimensioned to receive a leverage rod.

6. The water heater wrench adapter of claim 1, wherein said rotating adapter grippingly secures the water heater element.

7. The water heater wrench adapter of claim 1, wherein the portion of the water heater element comprises an insulator.

8. The water heater wrench adapter of claim 7, wherein said faces cooperatively engage the insulator in a light interference fit.

9. The water heater wrench adapter of claim 1, wherein said receiver comprises a hexagonal extension.

10. The water heater wrench adapter of claim 9, further comprising an associated wrench having a hex end, wherein said hexagonal extension is dimensioned slightly smaller than said hex end.

11. The water heater wrench adapter of claim 10, wherein said hexagonal extension has substantially the same hexagonal dimension as a hex nut of the water heater element.

12. The water heater wrench adapter of claim 11, wherein said water heater wrench comprises said hex end dimensioned to cooperatively engage the hex nut of the water heater element and said hex extension of said receiver when the hex nut of the water heater element and said hex extension of said receiver are in alignment.

13. A method of replacing a water heater element, said method comprising the steps of:
    obtaining a water heater wrench adapter having a rotating adapter comprising faces dimensioned to cooperatively engage a portion of a water heater element, and a receiver having a hex extension, wherein said receiver is rotationally disposed about said rotating adapter and dimensioned to frictionally engage said rotating adapter in a light interference fit;
    rotating said receiver to a position wherein said hex extension is aligned with a hex nut of the water heater element;
    disposing a wrench having a hex end over said water heater wrench adapter, wherein said hex end cooperatively engages said aligned hex extension/hex nut; and
    turning said wrench.

14. The method of claim 13, wherein said wrench comprises a handle having throughholes therein, said method further comprising the step of:
    inserting a screwdriver into said throughholes, wherein said screwdriver provides leverage for said step of turning said wrench.

15. The method of claim 13, further comprising the step of: removing the water heater element.

16. The method of claim 13, further comprising the steps of:
    installing a new water heater element.

17. A water heater wrench adapter comprising:
    a rotating adapter dimensioned to grip a portion of a water heater element; and
    a receiver rotationally disposed about said rotating adapter and dimensioned to frictionally engage said rotating adapter in a light interference fit.

18. The water heater wrench adapter of claim 17, wherein said receiver comprises a hexagonal extension having substantially the same hexagonal dimension as a hex nut of the water heater element.

19. The water heater wrench adapter of claim 18, wherein when said hexagonal extension and the hex nut are aligned, said aligned hexagonal extension and hex nut are cooperatively engaged by a hex end of a wrench.

20. The water heater wrench adapter of claim 19, wherein said hex end is dimensioned approximately the same as, but slightly larger than, the hexagonal dimension of the hex nut and said hex extension.

* * * * *